(12) United States Patent
Hashizume

(10) Patent No.: US 6,927,880 B2
(45) Date of Patent: Aug. 9, 2005

(54) IMAGE READING DEVICE AND METHOD

(75) Inventor: Yusuke Hashizume, Tokyo (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 866 days.

(21) Appl. No.: 09/964,635

(22) Filed: Sep. 28, 2001

(65) Prior Publication Data

US 2003/0063328 A1 Apr. 3, 2003

(51) Int. Cl.[7] .............................. H04N 1/40; H04N 1/04
(52) U.S. Cl. ....................... 358/471; 358/497; 358/474; 358/412; 318/696; 318/685
(58) Field of Search ................................ 358/471, 497, 358/474, 494, 486, 412, 505, 500; 399/211, 208, 210; 250/234–236; 318/696, 685

(56) References Cited

U.S. PATENT DOCUMENTS

| | | | |
|---|---|---|---|
| 5,124,744 A | * 6/1992 | Ogura et al. | 355/51 |
| 6,009,292 A | * 12/1999 | Jinbo et al. | 399/208 |
| 6,147,776 A | * 11/2000 | Sakurai et al. | 358/471 |
| 6,316,902 B1 | * 11/2001 | Kitamura | 318/671 |
| 6,459,229 B1 | * 10/2002 | Kawanabe | 318/696 |
| 6,628,098 B2 | * 9/2003 | Kaufhold et al. | 318/696 |
| 6,747,765 B2 | * 6/2004 | Kitamura et al. | 358/497 |
| 6,750,627 B2 | * 6/2004 | Holdaway | 318/696 |
| 6,816,288 B1 | * 11/2004 | Hashizume | 358/474 |

FOREIGN PATENT DOCUMENTS

JP A1 2000-101791 4/2000

* cited by examiner

Primary Examiner—Cheukfan Lee
(74) Attorney, Agent, or Firm—Foley & Lardner LLP

(57) ABSTRACT

An image reading device reads an image of an original mounted on an original mounting base by using an optical scanning unit which is subjected to acceleration drive along the original mounting base until a velocity according to a reading magnification is obtained and then scanned by uniform velocity drive. A stepping motor moves the optical scanning unit. A reading magnification acceptance portion accepts a reading magnification of an image of the original mounted on the original mounting base. A motor drive control portion is used for control a drive electric current of the stepping motor, obliquely increases a set electric current during acceleration drive every velocity that the optical scanning unit reaches by a pulse number according to a reading magnification accepted by the reading magnification acceptance portion, and changes the set electric current value in accordance with the reading magnification so as to provide a characteristic for lowering the set electric current value at the time of shifting to uniform velocity drive. A photoelectric conversion portion converts a quantity of reflected light when the original on the original mounting base is optically scanned by the optical scanning unit moved by the stepping motor into an electrical signal.

10 Claims, 5 Drawing Sheets

IMAGE READING DEVICE AND METHOD

BACKGROUND OF THE INVENTION

The present invention relates to an image reading device. More particularly, in an image reading apparatus such as a scanner for use in an image forming apparatus, e.g., an electronic copying machine, the present invention relates to an image reading device and method for irradiating an original put on an original mounting base with a light ray from a light source which moves along the original mounting base and outputting an electrical signal according to a reflected light ray.

Conventionally, in an image reading device such as a scanner for use in an image forming apparatus such as an electronic copying machine, a scanner has been put into practical use, in which an original put on an original mounting base consisting of transparent glass is exposed by an exposure lamp, and a reflected light ray is taken into a CCD line sensor where the light ray is subjected to photoelectric conversion, thereby reading an image on the original.

A mirror or the like for leading the reflected light ray from the exposure lamp or the original to the CCD line sensor is provided on a scanning carriage.

Further, in such an image reading device, for example, a scanner, when reading the original on the original mounting base, an image on the entire original is read by reading that image every line in the main scanning direction while moving the scanning carriage in the sub scanning direction.

Furthermore, in such an image reading device, e.g., a scanner, the light source is moved from a home position to a reading area of the original on the original mounting base in the sub scanning direction of the original by the scanning carriage.

In this case, as shown in FIG. 5A, after being linearly accelerated from the home position by a motor for driving the scanning carriage until a predetermined moving velocity according to a reading magnification is achieved, the scanning carriage passes a reading start position (light irradiation start position) of the image of the original on the original mounting base and performs reading the image of the original on the original mounting base while maintaining a uniform velocity.

In general, as this motor for driving the scanning carriage, a stepping motor driven by pulse control is used.

FIG. 5B shows the state in which a motor electric current is controlled to be switched from a high electric current value to a low electric current value, electric currents of which have the same constant electric current value with any reading magnification, in case of performing linear acceleration and maintaining a uniform velocity by the motor for driving the scanning carriage.

That is, when linear acceleration by the motor for driving the scanning carriage mentioned above is used, since this is simple linear acceleration such that the electric current is controlled to be switched from a high electric current value to a low electric current value, electric currents of which have the same constant values, with any reading magnification, a capacity of firmware including a motor driver and others can be minimum.

Thus, when the output torque is decreased when the velocity (frequency) is increased because of the torque-frequency characteristic such as shown in FIG. 6, a motor which does not step out in a high-velocity domain is required as the motor mentioned above.

That is, in a drive system having a necessary torque domain A such as shown in FIG. 7, since step out of the motor 1 having the illustrated torque-frequency characteristic B is observed, a motor 2 having a torque-frequency characteristic C as shown in the drawing is used.

Here, a difference between the motor 1 and the motor 2 is whether the output torque is increased by extending a rotor length or the like inside the motor.

Therefore, using the motor having the output torque increased in this manner increases the size of the motor itself, which leads to increase in cost.

Furthermore, when the motor having the output torque which is not very large is used, the excessive torque is observed in driving at a low speed even if the electric current value is decreased, which can be a factor for generating undesired vibrations in the scanning carriage.

That is, when vibrations are generated in the scanning carriage, there occurs a serious problem that image vibrations are generated in a result of reading as a scanner due to remaining vibrations.

As mentioned above, in the image reading device such as a scanner, driving the scanning carriage (optical system) using the stepping motor driven by pulse control causes optical reading of the original put on the original mounting base.

Moreover, as a method for controlling acceleration drive of the stepping motor in the image reading device such as a scanner, a control method such as linear acceleration, multi-stage linear acceleration or the like is used to carry out acceleration control in the prior art.

In regard to the method for performing acceleration control, there is known a control method for reducing the remaining vibrations when shifting to a uniform velocity by slowly and gradually controlling the acceleration as well as a method for simply performing linear acceleration.

That is, as disclosed in Jpn. Pat. Appln. KOKAI publication No. 2000-184142, Jpn. Pat. Appln. KOKAI publication No. 2000-307814 and the like, this is known as a control method for reducing the rising acceleration and decreasing a drive electric current to be supplied in a slow-up last period before rising to the constant velocity (uniform velocity) operation by which image reading scanning is performed.

However, even in this control method, control is performed by the same constantly high electric current value with any reading magnification during acceleration or during the constant velocity (uniform velocity) operation. Therefore, since the motor rotates with the excessive torque at a low velocity during acceleration with any reading magnification as a matter of course, vibrations are generated, which affects the scanning carriage.

As described above, when vibrations are generated in the scanning carriage, image vibrations are produced in a result of reading as a scanner due to the remaining vibrations.

BRIEF SUMMARY OF THE INVENTION

It is an object of the present invention to provide an image reading device and method for enabling suppression of vibrations at the time of a constant velocity (uniform velocity) and suppression of occurrence of image vibrations at the time of reading an original by performing arbitrary electric current control according to arbitrary acceleration/velocity according to a reading magnification to a motor for driving a scanning carriage and controlling the motor to rotate with an electric current value which is optimum even at a low velocity during acceleration.

To achieve this object, according to the present invention, (1) there is provided an image reading device for reading an image of an original mounted on an original mounting base by optical scanning means which is subjected to acceleration drive along the original mounting base until a speed according to a reading magnification is achieved and thereafter scanned by uniform velocity drive, the image reading device comprising:

a stepping motor which moves the optical scanning means;

reading magnification accepting means which accepts a reading magnification of an image of the original mounted on the original mounting base;

motor drive controlling means which controls drive of the stepping motor, and obliquely increases a set electric current value during acceleration drive every velocity which the optical scanning means reaches by a pulse number according to a reading magnification accepted by the reading magnification accepting means, and changes the set electric current value in accordance with the reading magnification in such a manner that a characteristic for reducing the set electric current value when shifting to uniform velocity drive is provided; and photoelectric converting means which converts a quantity of reflected light when the original on the original mounting base is optically scanned by the optical scanning means moved by the stepping motor into an electrical signal.

To achieve the above-described object, according to the present invention, (2) there is provided an image reading device defined in (1), wherein the motor drive controlling means includes a memory for storing therein a pulse number according to a reading magnification accepted by the reading magnification accepting means and a set electric current value which obliquely increases an electric current during acceleration drive every velocity which the optical scanning means reaches and which is changed in accordance with the reading magnification in such a manner that a characteristic for reducing the electric current at the time of shifting to uniform velocity drive is provided when controlling drive of the stepping motor.

To achieve this object, according to the present invention, (3) there is provided an image reading device defined in (1), wherein the motor drive controlling means includes: a memory for storing therein a pulse number according to a reading magnification accepted by the reading magnification accepting means and a set electric current value which obliquely increases an electric current during acceleration drive every velocity which the optical scanning means reaches and which is changed in accordance with the reading magnification in such a manner that a characteristic for reducing the electric current at the time of shifting to uniform velocity drive is provided when controlling drive of the stepping motor;

a CPU which supplies a drive clock having a predetermined frequency and a phase current setting signal to the stepping motor; and a motor driver which controls drive of the stepping motor based on the pulse number and the set electric current value from the memory and the drive clock having a predetermined frequency and the phase current setting signal from the CPU.

To achieve this object, according to the present invention, (4) there is provided an image reading method for reading an image of an original mounted on an original mounting base by using optical scanning means which is subjected to acceleration drive along the original mounting base until a velocity according to a reading magnification is achieved by the stepping motor and thereafter moved by uniform velocity drive, the method comprising the steps of:

accepting a reading magnification of an image of the original mounted on the original mounting base;

obliquely increasing a set electric current value during acceleration drive every velocity which the optical scanning means reaches by a pulse number according to the accepted reading magnification and changing the set electric current value in accordance with the reading magnification in such a manner that a characteristic for reducing the set electric current value at the time of shifting to uniform velocity drive is provided, when driving the stepping motor; and converting a quantity of reflected light when an original on the original mounting base is optically scanned by the optical scanning means which is moved by the stepping motor into an electrical signal.

To achieve the above-described object, according to the present invention, (5) there is provided an image reading device for reading an image of an original mounted on an original mounting base by using optical scanning means which is subjected to acceleration drive along the original mounting base until a velocity according to a reading magnification is obtained and thereafter scanned by uniform velocity drive, the image reading device comprising:

a stepping motor which moves the optical scanning means;

reading magnification accepting means which accepts a reading magnification of an image of an original mounted on the original mounting base;

motor drive controlling means which controls drive of the stepping motor, and optimizes a set electric current value during acceleration drive every velocity that the optical scanning means reaches and a set electric current value at the time of shifting to uniform velocity drive by a pulse number according to a reading magnification accepted by the reading magnification accepting means so as not to generate vibrations in the stepping motor; and photoelectric converting means which converts a quantity of reflected light when the original on the original mounting base is optically scanned by the optical scanning means which is moved by the stepping motor into an electrical signal.

To achieve the above-described object, according to the present invention, (6) there is provided the image reading device defined in (5), wherein the motor drive controlling means includes a memory storing therein a pulse number according to a reading magnification accepted by the reading magnification accepting means, an electric current during acceleration drive every velocity that the optical scanning means reaches and an electric current at the time of shifting to uniform velocity drive as set electric current values optimized so as not to generate vibrations in the stepping motor, when controlling drive of the stepping motor.

To achieve the above-described object, according to the present invention, (7) there is provided an image reading device defined in (5), wherein the motor drive electric current controlling means includes:

a memory which stores therein a pulse number according to a reading magnification accepted by the reading magnification accepting means, an electric current during acceleration drive every velocity that the optical scanning means reaches and an electric current at the time of shifting to uniform velocity drive as set electric current values optimized so as not to generate vibrations in the stepping motor, when controlling drive of the stepping motor;

a CPU which supplies to the stepping motor a drive clock having a predetermined frequency and a phase current setting signal; and a motor driver which controls a drive electric current for the stepping motor based on the pulse number and the set electric current values from the memory and the drive clock having a predetermined frequency and the phase electric current set signal from the CPU.

To achieve the above-described object, according to the present invention, (8) there is provided the image reading device defined in (5), wherein, when controlling drive of the stepping motor, the motor drive controlling means calculates an electric current from a product of a step-out point of the stepping motor and a safety factor so that the electric current is set every velocity which the optical scanning means reaches, in order to optimize an electric current during acceleration drive so as not to generate vibrations in the stepping motor every velocity that the optical scanning means reaches by the pulse number according to the reading magnification accepted by the reading magnification accepting means.

To achieve the above-described object, according to the present invention, (9) there is provided an image reading device defined in (5), wherein, when controlling drive of the stepping motor, in order that the motor drive controlling means optimizes an electric current during acceleration drive so as not to generate vibrations in the stepping motor every velocity which the optical scanning means reaches by a pulse number according to the reading magnification accepted by the reading magnification accepting means, an electric current value easily obtained from current-torque characteristic data of the stepping motor is set.

To achieve the above-described object, according to the present invention,

(10) there is provided an image reading method for reading an image of an original mounted on an original mounting base by using optical scanning means which is subjected to acceleration drive along the original mounting base until a velocity according to a reading magnification is obtained by a stepping motor and thereafter moved by uniform velocity drive, the method comprising the steps of:

accepting a reading magnification of the original image mounted on the original mounting base;

optimizing a set electric current value during acceleration drive every velocity which the optical scanning means reaches and a set electric current value at the time of shifting to uniform drive so as not to generate vibrations in the stepping motor by a pulse number according to the accepted reading magnification, when driving the stepping motor; and converting a quantity of reflected light when the original on the original mounting base is optically scanned by the optical scanning means which is moved by the stepping motor into an electrical signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the present invention.

DETAILED DESCRIPTION OF THE INVENTION

Figure 1A:
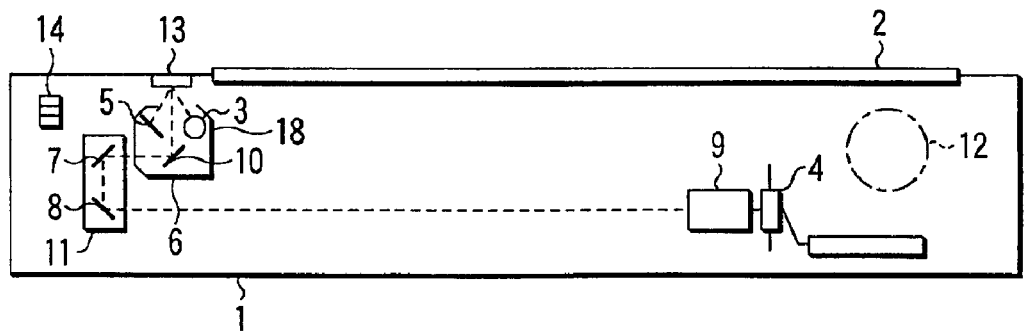
FIG. 1A is a side view schematically showing an inner structure of a scanner as an image reading device according to an embodiment of the present invention.

Reference will be made in detail to the presently preferred embodiments of the invention as illustrated in the accompanying drawings, in which like reference numerals designate like or corresponding parts.

The outline of the present invention will first be described.

Here, a set electric current value in a scanner as an image reading device under the following conditions is calculated from a measured value (frequency-torque characteristic data).

Conditions: (assuming a scanner as an image reading device having approximately 65 cpm)

Reading magnification: 100%

Scanning velocity: 336 mm/sec

Moderation ratio: 1:3.5

Acceleration: 6000 mm/sec$^2$

Set electric current value of a motor for driving a scanning carriage in a scanner as an image reading device under satisfying the above conditions (acceleration):

At 672 mm/sec: 0.90 (A)

At 473.2 mm/sec: 0.83 (A)

At 336 mm/sec: 0.81 (A)

In desk calculation, although the accelerating torque does not change unless the acceleration varies, since the mechanical load on the scanning carriage or the like actually increases when the velocity rises, the necessary torque of the motor for driving the scanning carriage is increased.

Figure 1B:
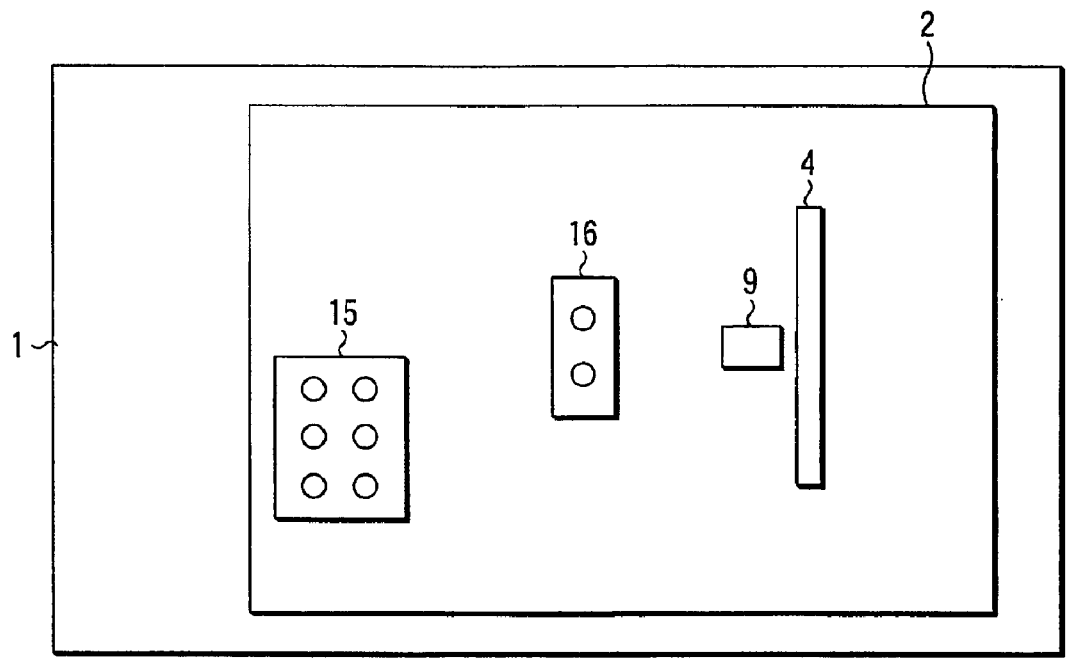
FIG. 1B is a plane view schematically showing an inner structure of a scanner as an image reading device according to an embodiment of the present invention.

In the scanner as a conventional image reading device, as shown in FIGS. 1A and 1B, when shifting from acceleration drive to uniform velocity drive of the scanning carriage, an electric current of the motor for driving the scanning carriage is simply gradually switched such that it is controlled to be switched from the same constant high electric current value to the same low electric current value with any reading magnification. Further, the electric current value when changing the scanning velocity (changing the reading magnification) is set to be an electric current required for the maximum velocity. When the uniform velocity is low, the torque becomes excessive during acceleration, and undesired vibrations are generated.

Furthermore, in the scanner as the conventional image reading device, as shown in FIGS. 1A and 1B, when shifting from acceleration drive to uniform velocity drive of the scanning carriage, the electric current of the motor for driving the scanning carriage is just gradually switched. In case of the constant velocity of 336 mm/sec that the uniform velocity is low, therefore, fluctuation in torque becomes large when shifting from acceleration drive to uniform velocity drive of the scanning carriage, and undesired vibrations are produced.

Figure 3A:
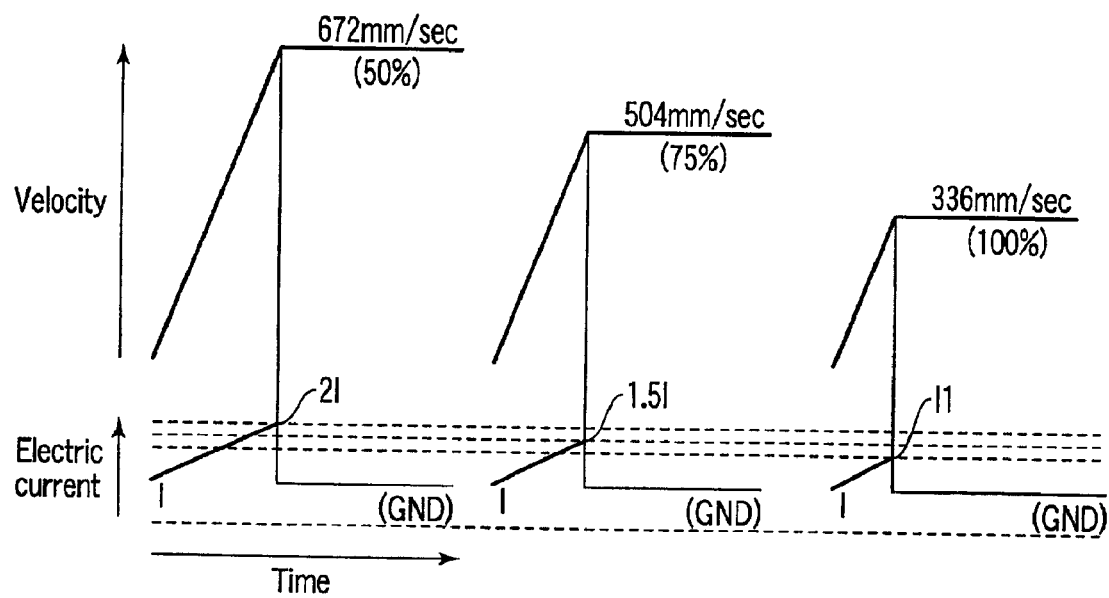
FIG. 3A is a view for illustrating a conformation of drive control over a motor for driving a scanning carriage in a scanner as an image reading device according an embodiment of the present invention.

Thus, in a scanner as an image reading device according to the present invention, as shown in FIG. 3A, a set electric current value of the motor for driving the scanning carriage during acceleration is previously obtained by actual measurement or the like every scanning velocity according to a reading magnification of the scanning carriage, and the obtained value is stored in a memory such as a flash memory together with a pulse number in accordance with each scanning velocity according to a reading magnification. The electric current of the motor for driving the scanning carriage is controlled based on the pulse number and the set electric current value stored therein, and the electric current is switched when shifting from acceleration drive to uniform velocity drive of the scanning carriage, thereby suppressing occurrence of undesired vibrations.

In this case, as the set electric current value of the motor for driving the scanning carriage stored in the memory every scanning velocity according to a reading magnification of the scanning carriage, as shown in FIG. 3A, in case of the scanning velocity 336 mm/sec with the reading magnification 100%, there is set an electric current value which obliquely increases from a predetermined electric current I to I1 in accordance with an achieved velocity during acceleration drive and has a first characteristic (1) that the electric current immediately lowers from I1 to I when shifting to uniform velocity drive.

Moreover, as shown in FIG. 3A, in case of a scanning velocity 504 mm/sec with the reading magnification 75%, there is set an electric current value which obliquely increases from the predetermined electric current I to 1.5 I1 in accordance with an achieved velocity during acceleration drive and has a second characteristic (2) that the electric current immediately lowers from 1.5 I1 to I when shifting to uniform velocity drive.

In addition, as shown in FIG. 3A, in case of a scanning velocity 672 mm/sec with the reading magnification 50%, there is set an electric current value which obliquely increases from the predetermined electric current I to 2 I1 in accordance with an achieved velocity during acceleration drive and has a third characteristic (3) that the electric current immediately lowers from 2 I1 to I when shifting to uniform velocity drive.

That is, by doing so, in case of the constant velocity 336 mm/sec that the velocity is low during uniform velocity drive in particular, since the motor drive electric current during acceleration drive is a low electric current, fluctuation in torque does not become large when shifting from acceleration drive to uniform velocity drive of the scanning carriage, which can prevent undesired vibrations from occurring.

Figure 3B:
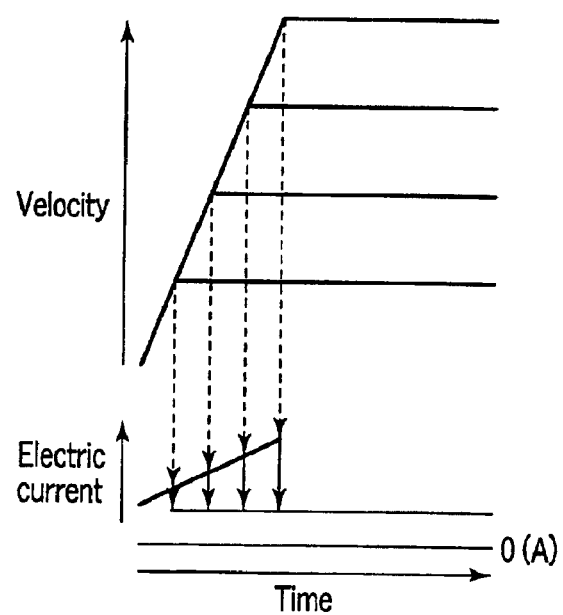
FIG. 3B is a view for illustrating a conformation of drive control over a motor for driving a scanning carriage in a scanner as an image reading device according an embodiment of the present invention.

In addition, in the scanner as the image reading device according to the present invention, as shown in FIG. 3B, an acceleration electric current value is previously obtained by actual measurement or the like every achieved velocity (constant velocity) at the time of acceleration drive as similar to the above-described set electric current value, and the obtained value is stored in a memory such as a flash memory so that the electric current of the motor for driving the scanning carriage is driven at an electric current value which is optimum for the scanning optical system. As a result, the scanning optical system including the scanning carriage with less vibrations can be realized.

If such an invention can be realized, therefore, it is possible to provide an image reading device and an image reading method which can suppress vibrations at the constant velocity (uniform velocity) and suppress occurrence of image vibrations when reading an original by performing arbitrary electric current control according to an arbitrary acceleration/velocity with respect to the motor for driving the scanning carriage and controlling the motor to rotate with the optimum electric current value even at a low speed during acceleration.

An image reading device and method according to an embodiment of the present invention based on the above-mentioned outline will now be described with reference to the drawings.

FIG. 1A is a side view schematically showing an inner structure of a scanner to which an image reading device and method according to an embodiment of the present invention is applied.

FIG. 1B is a plane view schematically showing an inner structure of the scanner to which the image reading device and method according to the embodiment of the present invention is applied.

A scanner 1 as the image reading device optically reads image information of an original mounted on an original mounting base 2.

The scanner 1 has the original mounting base 2 on which an original to be read is mounted, a light source (a halogen lamp, a fluorescent lamp, a xenon lamp or the like) for illuminating the original put on the original mounting base 2, and a CCD line sensor 4 for subjecting a reflected light ray from the original illuminated from the light source 3 through the original mounting base 2 to photoelectric conversion so that the reflected light ray can be converted into an image information signal.

It is to be noted that a reflector 5 for efficiently converging the illumination light from the light source 3 onto the original is arranged on the side of the light source 3.

Additionally, a plurality of mirrors 6, 7 and 8 for curving a light path along which a light ray proceeding from the original to the CCD line sensor 4, i.e., the reflected light from the original passes and a lens 9 for converging the reflected light onto the converging plane of the CCD sensor 4 and others are arranged between the light source 3 and the CCD line sensor 4.

Further, the original mounted on the original mounting base 2 is subjected to exposure scanning at the time of reciprocation when the scanning optical system including the scanning carriage 18 which consists of the light source 3 and the mirrors 6, 7 and 8 reciprocates along the lower surface of the original mounting base 2 in the direction indicated by an arrow a in the drawing.

In this case, the mirrors 7 and 8 moves at a speed which is ½ of that of the mirror 6 so as to maintain a predetermined light path length.

The reflected light from the original obtained by scanning of the scanning optical system including the scanning carriage 18, i.e., the reflected light from the original obtained by light irradiation of the light source 3 is reflected on the mirrors 6, 7 and 8 and thereafter passes through the lens 9. It is then led by the CCD line sensor 4 so that an image of the original is formed on the surface of the CCD line sensor 4.

The light source 3, the mirrors 6,7 and 8, the lens 9 and the CCD line sensor 4 constitute the scanning unit.

The light source 3, the mirror 6 and the reflector 5 are provided to a first carriage 10.

Further, the mirrors 7 and 8 are provided to a second carriage 11.

Furthermore, the first and second carriages 10 and 11 constitute the scanning carriage 18, and they are caused to reciprocate in the direction indicated by an arrow a in the drawing by a stepping motor 12.

A white reference plate 13 for generating a white reference signal used for shading compensation is provided in the vicinity of the original mounting base 2.

The white reference plate 13 is irradiated with a light ray from the light source 3 before reading the original, and the reflected light from the white reference plate 13 is led to the CCD line sensor 4.

A home position sensor 14 for detecting that the first carriage 10 is placed at a home position (HP) is provided in the vicinity of the white reference plate 13.

Original size detection sensors 15 and 16 for detecting a size of the original mounted on the original mounting base 2 are provided to the lower part of the original mounting base 2.

A control circuit 17 for controlling the entire scanner 1 is provided in the vicinity of the CCD line sensor 4 at the lower part of the original mounting base 2.

An original holder (not shown) for pressing the original against the original mounting base 2 is arranged at an upper part of the original mounting base 2.

This original holder can be substituted by, for example, an SDF (semi-auto document feeder), i.e., a semi-auto original feeder or an ADF (auto document feeder), i.e., an automatic original feeder.

Figure 2:
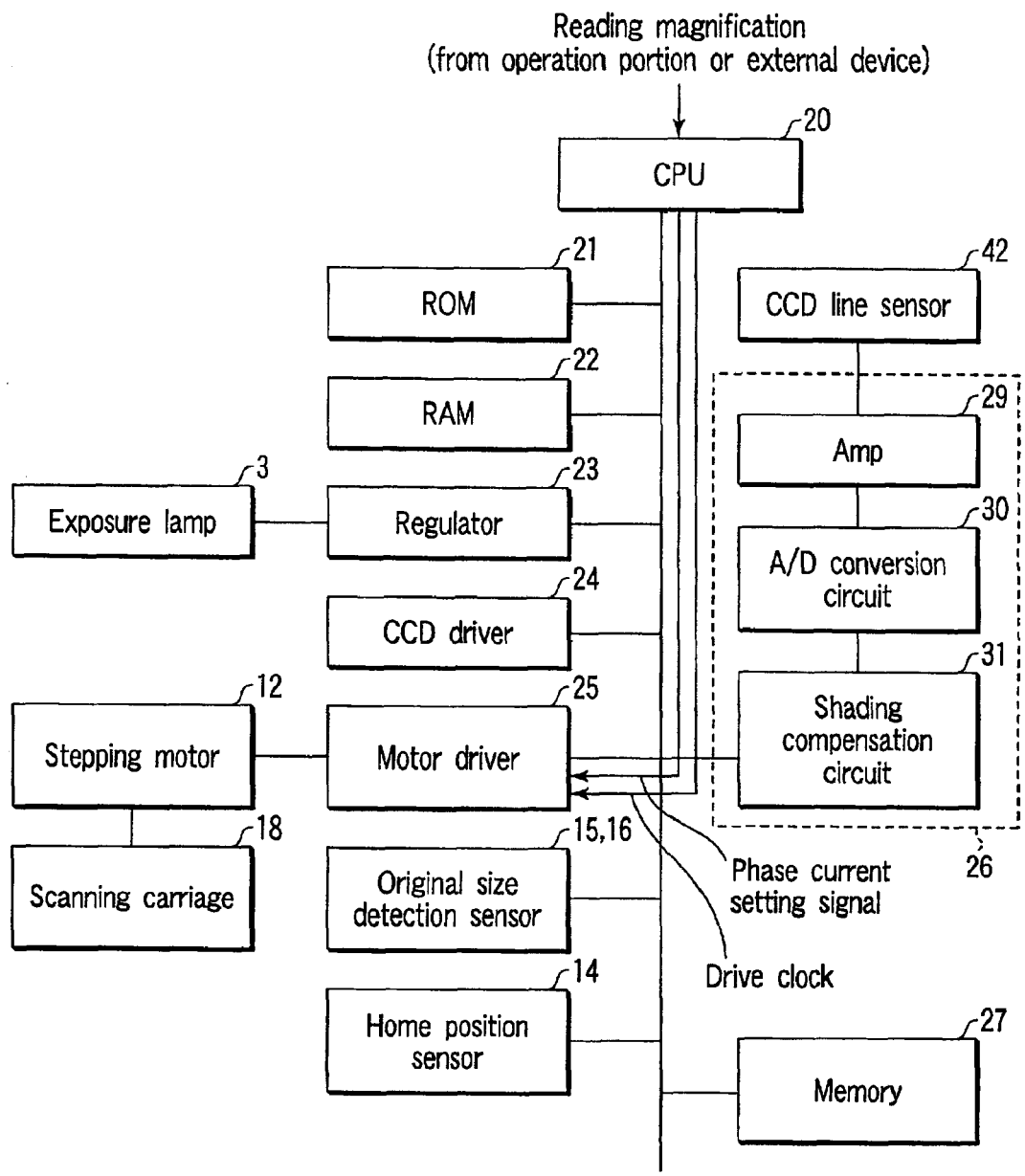
FIG. 2 is a block diagram schematically showing a structure of a control circuit of a scanner as an image reading device according to an embodiment of the present invention.

FIG. 2 is a block diagram schematically showing a structure of a control circuit of the scanner 1 as the image reading device according to an embodiment of the present invention.

That is, the control circuit 17 of the scanner 1 is constituted by: a CPU 20 for controlling the entire scanner; a ROM 21 storing therein a control program or the like; a RAM 22 for storing therein various kinds of data; a regulator 23 for controlling lighting and a quantity of light of the light source 3; a CCD driver 24 for driving the CCD line sensor 4; a motor driver 25 for driving the stepping motor 12 for driving the first and second carriages 10 and 11 constituting the scanning carriage 18; an image processing circuit 26 for processing a signal from the CCD line sensor 4; and a memory 27 such as a flash memory storing therein a pulse number and a set electric current value of the stepping motor 12 for driving the scanning carriage every scanning velocity according to at least three reading magnifications, which will be described later, of the scanning carriage.

That is, the memory 27 stores therein, as a pulse number and a set electric current value of the stepping motor 12 for driving the scanning carriage every scanning velocity according to the reading magnification, an electric current value which obliquely increases from a predetermined electric current I to I1 in response to an achieved velocity during acceleration drive at the scanning velocity 336 mm/sec with the reading magnification 100% and has a first characteristic (1) that the electric current is immediately lowered from I1 to I when shifting to uniform velocity drive, and a pulse number according to the achieved velocity.

Further, the memory 27 stores therein an electric current value which obliquely increases from the predetermined electric current I to 1.5 I1 in response to an achieved velocity during acceleration drive at the scanning velocity 504 mm/sec with the reading magnification 75% and has a second characteristic (2) that the electric current is immediately lowered from 1.5 I1 to I when shifting to uniform velocity drive, and a pulse number according to the achieved velocity.

Furthermore, the memory 27 stores therein an electric current value which obliquely increases from the predetermined electric current I to 2I1 in response to an achieved velocity during acceleration drive at the scanning speed 672 mm/sec with the reading magnification 50% and has a third characteristic (3) that the electric current is immediately lowered from 2I1 to I when shifting to uniform velocity drive, and a pulse number according to the achieved velocity.

Moreover, to the CPU 20 are connected the home position sensor 14 and the original size detection sensors 15 and 16.

The image processing circuit 26 is constituted by an amplifier 29 for amplifying an analog signal supplied from the CCD line sensor 4, an A/D conversion circuit 30 for converting an analog signal amplified by the amplifier 29 into a digital signal, and a shading compensation circuit 31 for compensating an electrical signal from the CCD line sensor 4 generated due to irregularities in illumination by the light source 3 or a change in ambient temperature by using a shading compensation value (reference signal).

The shading compensation value is used for compensating a change in the electrical signal from the CCD line sensor 4 caused due to irregularities of illumination by the light source 3 or a change in ambient temperature, and this value can be obtained by an electrical signal from the CCD line sensor 4 based on a quantity of reflected light from the white reference plate 13.

A drive clock having a predetermined frequency and a phase current setting signal are supplied from the CPU 20 to the stepping motor 12 through the motor driver 25.

The stepping motor 12 is controlled through the motor driver 25 so as to be driven to rotate in such a manner as illustrated in FIGS. 3A and 3B based on a pulse number and a set electrical current value from the memory 27 previously storing therein the pulse number and the set electrical current value of the stepping motor 2 as the motor for driving the scanning carriage every scanning velocity of the scanning carriage 18 according to a reading magnification and also based on a drive clock having a predetermined frequency and a phase current setting signal from the CPU 20.

By rotation drive control over the stepping motor 12 in such a manner as illustrated in FIGS. 3A and 3B, arbitrary electric current control according to arbitrary acceleration/velocity can be performed with respect to the stepping motor 12 as the motor for driving the scanning carriage so that the stepping motor 12 can be rotated with an optimum electric current value at a low speed even during acceleration.

As a result, occurrence of vibrations of the stepping motor 12 at a constant velocity (uniform velocity) when a uniform velocity is low can be suppressed, and generation of image vibrations at the time of reading the original can be restrained.

Specifically, the rotation drive control over the stepping motor 12 is as follows.

(1) A set electric current value during acceleration is changed so as to have an obliquely increasing characteristic every velocity (constant velocity) which the scanning carriage reaches and corresponds to a reading magnification.

(2) A motor electric current during acceleration drive and when shifting to the uniform drive is optimized in order to suppress vibrations of the motor.

(3) As a method for optimizing the motor electric current (electric current value setting), an electric current can be calculated from a product of a motor step-out point and a safety factor, and it can be set with respect to each constant velocity (uniform velocity).

(4) As a method for optimizing the motor electric current (electric current value setting), an electric current may be easily obtained from an electric current-torque characteristic data of the motor.

Figure 4:
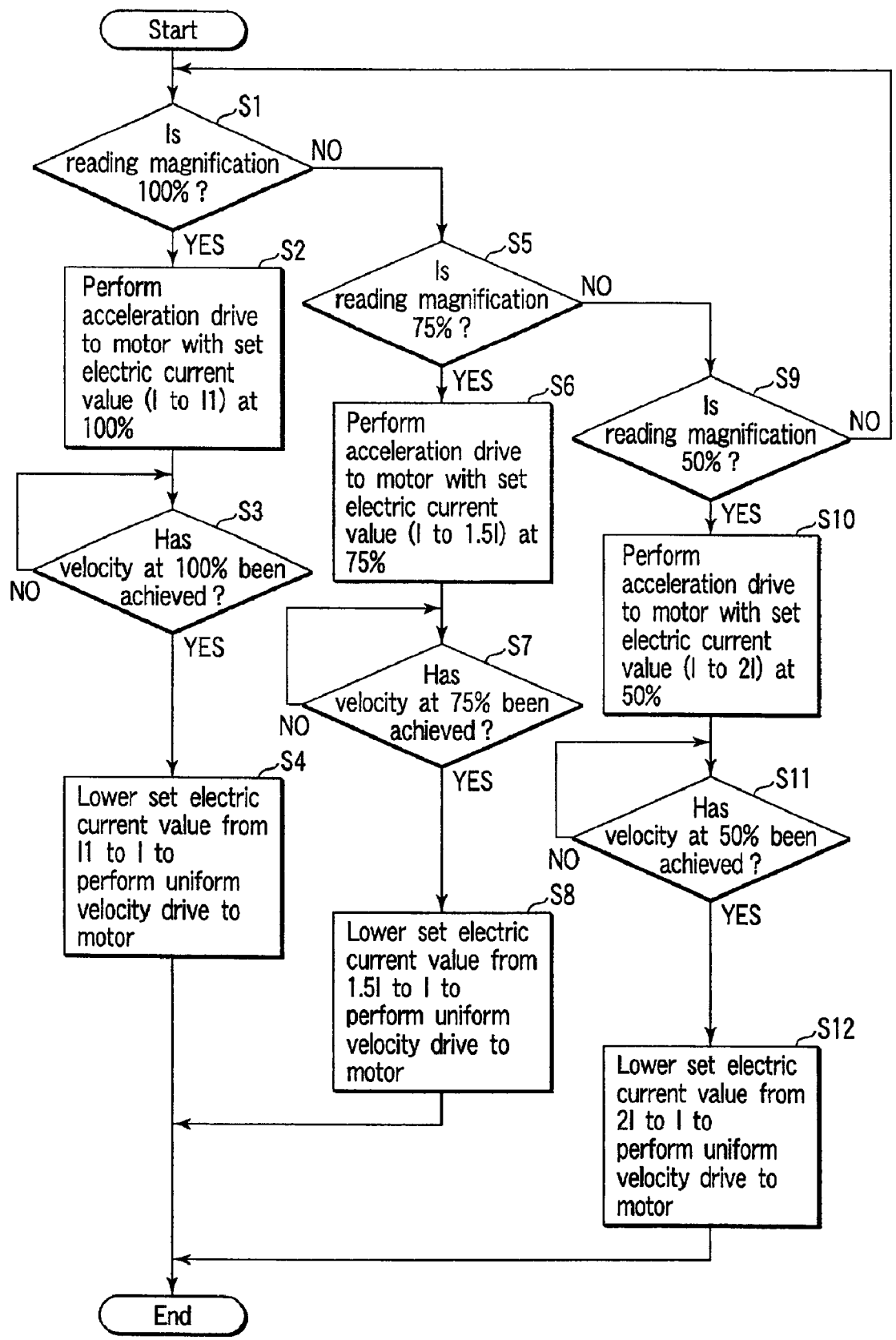
FIG. 4 is a flowchart for illustrating the operation of drive control over the motor for driving the scanning carriage in the scanner as the image reading apparatus according to an embodiment of the present invention.
Figure 5A:
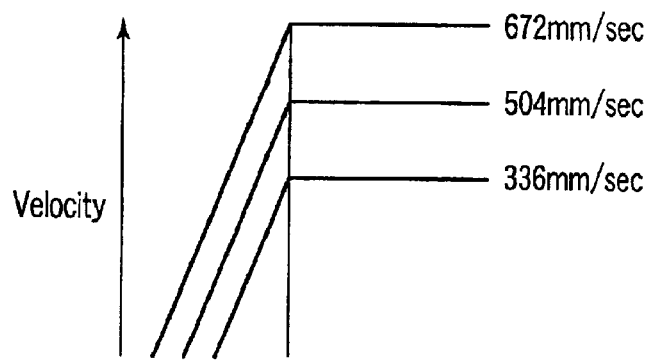
FIG. 5A is a view for illustrating a change in velocity involved by movement of a scanning carriage in a conventional scanner.
Figure 5B:
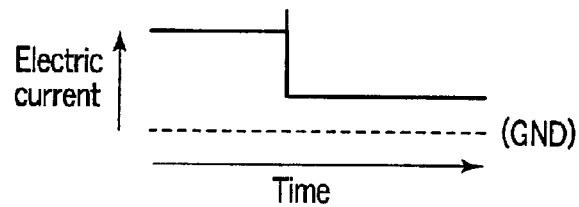
FIG. 5B is a view showing the state in which a motor electric current is controlled to be switched from the same constant high electric current value to the same low electric current value with any reading magnification during acceleration and during the constant velocity (uniform velocity) operation in case of performing the linear acceleration and uniform velocity control by the motor for driving the scanning carriage in the conventional scanner.
Figure 6:
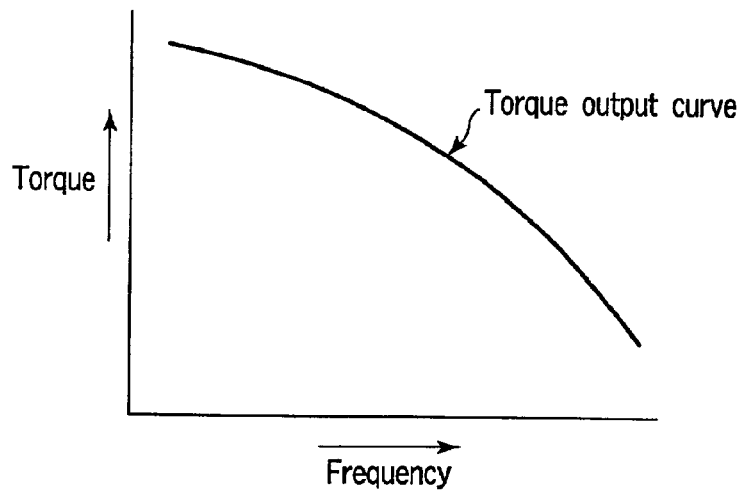
FIG. 6 is a view showing a torque-frequency characteristic of a motor for driving the scanning carriage in the conventional scanner.
Figure 7:
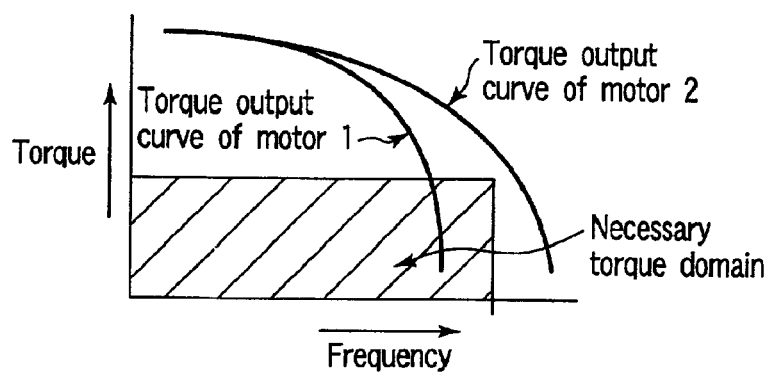
FIG. 7 is a view showing the relationship between a torque-frequency characteristic and a necessary torque domain of the motor for driving the scanning carriage in the conventional scanner.

Detailed description will now be given as to velocity control relative to the carriage 10 by the stepping motor 12 at the scanning velocity 226/sec with the reading magnification 100%, at the scanning velocity 504 mm/sec with the reading magnification 75% and the scanning velocity 672 mm/sec with the reading magnification 50% in the scanner having the above-described structure with reference to a flowchart shown in FIG. 4.

Incidentally, it is assumed that the CPU 20 accepts a reading magnification specified by a non-illustrated operation portion or an external device and the following operation is started.

At the step S1, the CPU 20 first accepts a reading magnification specified by a non-illustrated operation portion or an external device and makes judgment upon whether the accepted reading magnification is the reading magnification 100% used at the scanning velocity 336 mm/sec.

As a result of judgment at the step S1, if the accepted reading magnification is the reading magnification 100% used at the scanning velocity 336 mm/sec, the CPU 20 proceeds to processing at the step S2.

Then, at the step S2, the CPU 20 reads from the memory 27 an electric current value which obliquely increases from I to I1 during acceleration drive in response to an achieved velocity at the scanning velocity 336 mm/sec with the reading magnification 100% and has a first characteristic (1) that the electric current value immediately lowers from I1 to I and a pulse number according to the achieved velocity, and performs acceleration drive with respect to the stepping motor 12 through the motor driver 25 by the electric current which obliquely increases from a predetermined electric current I to I1 in response to an achieved velocity.

Subsequently, at the step S3, the CPU 20 makes judgment upon whether the scanning carriage 18 has reached the scanning velocity 336 mm/sec with the reading magnification 100%. If the scanning carriage 18 has reached the scanning velocity 336 mm/sec, the CPU 20 advances to processing at the step S4.

At the step S4, the CPU 20 carries out uniform velocity drive with respect to the stepping motor 12 through the motor driver 25 by immediately lowering the electric current of the stepping motor 12 from I1 to I in order to shift to uniform velocity drive with respect to the scanning carriage 18 at the scanning velocity 336 mm/sec.

As a result, the original image can be read at the scanning velocity 336 mm/sec with the reading magnification 100%.

Incidentally, when the accepted reading magnification is not the reading magnification 100% used at the scanning velocity 336 mm/sec in judgment at the step S1, the CPU 20 proceeds to processing at the step S5.

At the step S5, the CPU 20 accepts the reading magnification specified by a non-illustrated operation portion or an external device, and makes judgment upon whether the accepted reading magnification is the reading magnification 75% used at the scanning velocity 504 mm/sect.

As a result of judgment at the step S5, if the accepted reading magnification is the reading magnification 75% used at the scanning velocity 504 mm/sec, the CPU 20 advances to processing at the step S6.

Subsequently, at the step S6, the CPU 20 reads from the memory 27 an electric current value which obliquely increases from I to 1.5 I1 during acceleration drive in response to an achieved velocity and has a second characteristic (2) that the electric current value immediately drops from 1.5 I1 to I when shifting to uniform velocity drive and a pulse number according to the achieved velocity at the scanning velocity 504 mm/sec with the reading magnification 75%. Further, the CPU 20 performs acceleration drive with respect to the stepping motor 12 through the motor driver 25 with the electric current which obliquely increases from the predetermined electric current value I to 1.5 I1 in response to the achieved velocity.

Then, at the step S7, the CPU 20 makes judgment upon whether the scanning carriage 18 has reached the scanning velocity 504 mm/sec with the reading magnification 75%. If the scanning carriage 18 has reached the scanning velocity 504 mm/sec, the CPU 20 proceeds to processing at the step S8.

At the step S8, the CPU 20 carries out uniform velocity drive with respect to the stepping motor 12 through the motor driver 25 by immediately lowering the electric current of the stepping motor 12 from 1.5 I1 to I in order to shift to uniform velocity drive relative to the scanning carriage 18 at the scanning velocity 504 mm/sec.

Consequently, the original image can be read at the scanning velocity 504 mm/sec with the reading magnification 75%.

Incidentally, if the accepted reading magnification is not the reading magnification 75% used at the scanning velocity 504 mm/sec as a result of judgment at the step 5, the CPU 20 advances to processing at the step S9.

At the step S9, the CPU 20 accepts the reading magnification specified by a non-illustrated operation portion or an external device and makes judgment upon whether the accepted reading magnification is the reading magnification 50% used at the scanning velocity 672 mm/sec.

If the accepted reading magnification is the reading magnification 50% used at the scanning velocity 672 mm/sec as a result of judgment at the step S9, the CPU 20 proceeds to processing at the step S10.

Then, at the step S10, the CPU 20 reads from the memory 27 an electric current value which obliquely increases from I to 2I1 in response to an achieved velocity during acceleration drive and has a third characteristic (3) that the electric current values immediately drops from 2I1 to I when shifting to uniform velocity drive and a pulse number according to the achieved velocity at the scanning velocity 672 mm/sec with the reading magnification 50%. Furthermore, the CPU 20 performs acceleration drive with respect to the stepping motor 12 through the motor driver 25 with an electric current which obliquely increases from the predetermined electric current value I to 2I1 in response to the achieved velocity.

Subsequently, at the step S11, the CPU 20 makes judgment upon whether the scanning carriage 18 has reached the scanning velocity 672 mm/sec with the reading magnification 50%. If the scanning carriage 18 has reached the scanning velocity 672 mm/sec, the CPU 20 advances to processing at the step S12.

At the step S12, the CPU 20 carries out uniform velocity drive with respect to the stepping motor 12 through the motor driver 25 by immediately lowering the electric current of the stepping motor 12 from 2I1 to I in order to shift to uniform velocity drive relative to the scanning carriage 18 at the scanning velocity 672 mm/sec.

Consequently, the original image can be read at the scanning velocity 672 mm/sec with the reading magnification 50%.

Incidentally, if the accepted reading magnification is not the reading magnification 50% used at the scanning velocity 672 mm/sec as a result of judgment at the step S9, the CPU 20 returns to processing of the step S1 and the subsequent steps.

Moreover, if the CPU 20 determines that the scanning carriage 18 has not reached the respective achieved velocities as a result of judgment in the steps S3, S7 and S11, it continues judgment until the scanning carriage 18 reaches the respective achieved velocities.

By the above-described rotation drive control over the stepping motor 12, arbitrary electric current control according to arbitrary acceleration/velocity can be performed with respect to the stepping motor as the motor for driving the scanning carriage through the motor driver 25 so that the stepping motor 12 can be rotated with an optimum electric current even at a low velocity during acceleration.

Consequently, it is possible to suppress occurrence of vibrations of the stepping motor 12 at a constant velocity (uniform velocity) when the uniform velocity is low, and generation of image vibrations at the time of reading the original can be restrained.

Incidentally, although the memory 27 previously stores therein a pulse number and a set electric current value of the stepping motor 12 for driving the scanning carriage every scanning velocity according to at least three reading magnifications of the scanning carriage 18 in the above-described embodiment, these reading magnifications are not restricted the above values in the present invention. For example, the reading magnification 400% may be added, and a number of types of reading magnifications may be appropriately increased or decreased.

According to the present invention mentioned above, it is possible to provide an image reading device and method capable of suppressing vibrations at a constant velocity (uniform velocity) and restraining occurrence of image vibrations when reading the original by performing with respect to the motor for driving the scanning carriage arbitrary electric current control in response to arbitrary acceleration/velocity according to a reading magnification so that the motor can be controlled to rotate with an optimum electric current value even at a low velocity during acceleration.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An image reading device for reading an image of an original mounted on an original mounting base by using optical scanning means which is subjected to acceleration drive along said original image mounting base until a velocity according to a reading magnification is obtained and then scanned by uniform velocity drive, the image reading device comprising:

a stepping motor which moves said optical scanning means;

reading magnification accepting means which accepts a reading magnification of an image of the original mounted on said original mounting base;

motor drive controlling means which controls drive of said stepping motor, and obliquely increases a set electric current value during acceleration drive every velocity that said optical scanning means reaches by a pulse number according to the reading magnification accepted by said reading magnification accepting means and changes the set electric current value when shifting to uniform velocity drive in accordance with the reading magnification so as to provide a characteristic for lowering the set electric current value; and photoelectric converting means which converts a quantity of reflected light when optically scanning the original on said original mounting base by said optical scanning means moved by said stepping motor into an electrical signal.

2. The image reading device according to claim 1, wherein said motor drive controlling means includes a memory which stores therein a pulse number according to the reading magnification accepted by said reading magnification accepting means and a set electric current value which obliquely increases an electric current during acceleration drive every velocity that said optical scanning means reaches and which is changed in accordance with the reading magnification in such a manner that a characteristic for lowering the set electric current value when shifting to uniform velocity drive is provided, in case of controlling drive of said stepping motor.

3. The image reading device according to claim 1, wherein the motor drive controlling means includes:

a memory which stores therein a pulse number according to the reading magnification accepted by said reading magnification accepting means and a set electric current value which obliquely increases an electric current during acceleration drive every velocity that said optical scanning means reaches and which is changed in accordance with the reading magnification in such a manner that a characteristic for lowering the set electric current value when shifting to uniform velocity drive is provided, in case of controlling drive of said stepping motor;

a CPU which supplies a drive clock having a predetermined frequency and a phase current setting signal to said stepping motor; and a motor driver which controls drive of said stepping motor based on the pulse number and the set electric current value from said memory and the drive clock having a predetermined frequency and the phase current setting signal.

4. An image reading method for reading an image of an original mounted on an original mounting base by using optical scanning means which is subjected acceleration drive along said original mounting base until a velocity according to a reading magnification is obtained by a stepping motor and then moved by uniform velocity drive, the image reading method comprising the steps:

accepting a reading magnification of an image of the original mounted on said original mounting base;

obliquely increasing a set electric current value during acceleration drive every velocity that said optical scanning means reaches by a pulse number according to the accepted reading magnification and changing the set electric current value in accordance with the reading magnification in such a manner that a characteristic for lowering the set electric current value when shifting to uniform drive is provided, in case of driving said stepping motor; and converting a quantity of reflected light when the original on said original mounting base is optically scanned by said optical scanning means moved by said stepping motor into an electrical signal.

5. An image reading device for reading an image of an original mounted on an original mounting base by using optical scanning means which is subjected to acceleration drive along said original mounting base until a velocity according to a reading magnification is obtained and then scanned by uniform velocity drive, said image reading device comprising:

a stepping motor which moves said optical scanning means;

reading magnification accepting means which accepts a reading magnification of the image of the original mounted on said original mounting base;

motor drive controlling means which controls drive of said stepping motor, and optimizes a set electric current value during acceleration drive every velocity that said optical scanning means reaches and a set electric current value when shifting to uniform velocity drive by a pulse number according to the reading magnification accepted by said reading magnification accepting means so as not to generate vibrations in said stepping motor; and photoelectric converting means which converts a quantity of reflected light when the original on said original mounting base is optically scanned by said optical scanning means moved by said stepping motor into an electrical signal.

6. The image reading device according to claim 5, wherein the motor drive controlling means includes a memory storing therein a pulse number according to the reading magnification accepted by said reading magnification accepting means, and an electric current during acceleration drive very velocity that said optical scanning means reaches and an electric current when shifting to uniform velocity drive as set electric current values optimized so as not to generate vibrations in said stepping motor, in case of controlling drive of said stepping motor.

7. The image reading device according to claim 5, wherein said motor drive controlling means includes:

a memory which stores therein a pulse number according to the reading magnification accepted by said reading magnification accepting means, and an electric current during acceleration drive very velocity that said optical scanning means reaches and an electric current when shifting to uniform velocity drive as set electric current values optimized so as not to generate vibrations in said stepping motor, in case of controlling drive of said stepping motor;

a CPU which supplies a drive clock having a predetermined frequency and a phase current setting signal to said stepping motor; and a motor driver which controls a drive electric current of said stepping motor based on the pulse number and the set electric current values from said memory and the drive clock having a predetermined frequency and the phase current setting values from the CPU.

8. The image reading device according to claim 5, wherein said motor drive controlling means calculates an electric current from a product of a step-out point of said stepping motor and a safety factor so that the electric current value is set every velocity that said optical scanning means reaches in order to optimize an electric current during acceleration drive every velocity that said optical scanning means reaches by the pulse number according to the reading magnification accepted by said reading magnification accepting means so as not to generate vibrations in said stepping motor, in case of controlling drive of said stepping motor.

9. The image reading device according to claim 5, wherein said motor drive controlling means has an electric current value easily obtained from electric current-torque characteristic data of said stepping motor being set in order to optimize an electric current during acceleration drive every velocity that said optical scanning means reaches by the pulse number according to the reading magnification accepted by said reading magnification accepting means so as not to generate vibrations in said stepping motor, in case of controlling drive of said stepping motor.

10. An image reading method for reading an image of an original mounted on an original mounting base by using optical scanning means which is subjected to acceleration drive along said original mounting base until a velocity according to a reading magnification is obtained by a stepping motor and then moved by uniform velocity drive, said image reading method comprising the steps of:

accepting a reading magnification of the image of the original mounted on said original mounting base;

optimizing a set electric current value of a drive electric current of said stepping motor during acceleration drive every velocity that said optical scanning means reaches and a set electric current of the same when shifting to uniform velocity drive by a pulse number according to the accepted reading magnification so as not to generate vibrations in said stepping motor; and converting a quantity of reflected light when the original on the original mounting base is optically scanned by said optical scanning means moved by said stepping motor into an electrical signal.

* * * * *